Aug. 7, 1945.　　　F. G. BACK　　　2,381,634
TESTING DEVICE
Filed March 13, 1944　　　4 Sheets-Sheet 1

Inventor
Franz G. Back
By Michael S. Striker
his Agent

Aug. 7, 1945.  F. G. BACK  2,381,634
TESTING DEVICE
Filed March 13, 1944  4 Sheets-Sheet 4

Inventor
Franz G. Back
By Michael S. Striker
his agent

Patented Aug. 7, 1945

2,381,634

UNITED STATES PATENT OFFICE 2,381,634

TESTING DEVICE

Franz G. Back, New York, N. Y., assignor to Helix Gage Works, New York, N Y.

Application March 13, 1944, Serial No. 526,175

18 Claims. (Cl. 88—24)

My present invention relates to screw thread testing devices and comparators, and particularly to improved devices for testing and comparing the angle and lead of screw threads.

It is an object of my present invention to provide an improved device for performing these functions with greater accuracy than has been done heretofore.

It is a further object of my present invention to provide a comparator for comparing the thread flanks with one or more testing members in an extremely simple and efficient way.

Still a further object of my present invention consists of a comparator usable not only for testing screw threads but also other objects the contours of which have to be compared with testing members having prescribed contours.

Another object of my present invention consists of optical observation means for a comparator provided in such a manner as to greatly facilitate observation of adjacent and coinciding edges of the images of a tested object and a testing member.

Still another object of my present invention consists in combining the testing member with a measuring and indicating instrument in such a manner as to enable indication of the characteristics of the tested object, particularly the angle and lead of a screw thread, in a nearly automatic way.

With the above objects in view, my present invention mainly consists of an optical testing comparator comprising a projection screen, means for projecting on this screen the shadow image of an object the outline of which has to be tested and the image of a testing member having an outline with which the outline of this tested object has to be compared; these projecting means are working in such a manner that the outlines, i. e. the edge portions to be compared are lying adjacent to or superimposed upon each other, thereby enabling comparison of the same.

In order to enable projection of these outlines in the above defined way, it is advisable to arrange a projecting light source at a certain distance from the screen and to arrange both the object to be tested and the testing member or members in the path of the light beam directed by this light source on the screen. The tested object as well as the testing member or members are supported by separate supports movably normal to the path of the light beam so as to enable the operator of this comparator to move the images of the tested object and testing member or members into the correct position on the screen, namely with their tested and testing outlines adjacent to each other; of course, for certain purposes, it might be advisable to have these outlines coinciding or even superimposed.

In order to enable easy visual observation, distinction and comparison of the images of the tested object and the testing member, I have found it extremely advisable and advantageous to make the testing member of a semi-transparent colored material so as to create on the observation screen a colored image of this testing member. Since the tested member is usually opaque, it creates a nearly black shadow image on the screen. Such a black shadow image can be very well compared with the colored image of a testing member, much better than if the testing member were also opaque and created a black image on the screen.

The reason for this fact is that the difference in the color of the images of the tested and testing member makes overlapping of the same immediately visible; contrary thereto, this would not be the case if both images were equally black, since then the overlapping portions would appear in the same way as the other portions of the images of the tested object and testing member and not distinguish from the same. Furthermore, I have found that a thin transparent screen strip between the testing outline of the colored image of a testing member and the tested outline of the black shadow image of a tested object is much better visible than if both images are equally black.

I wish to note that the characteristic feature of my present invention disclosed in the preceding paragraph is of great importance not only for screw thread testing devices, but that it can be used with great advantage also for comparators of the general type claimed by me.

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawings in which:

Figure 1:
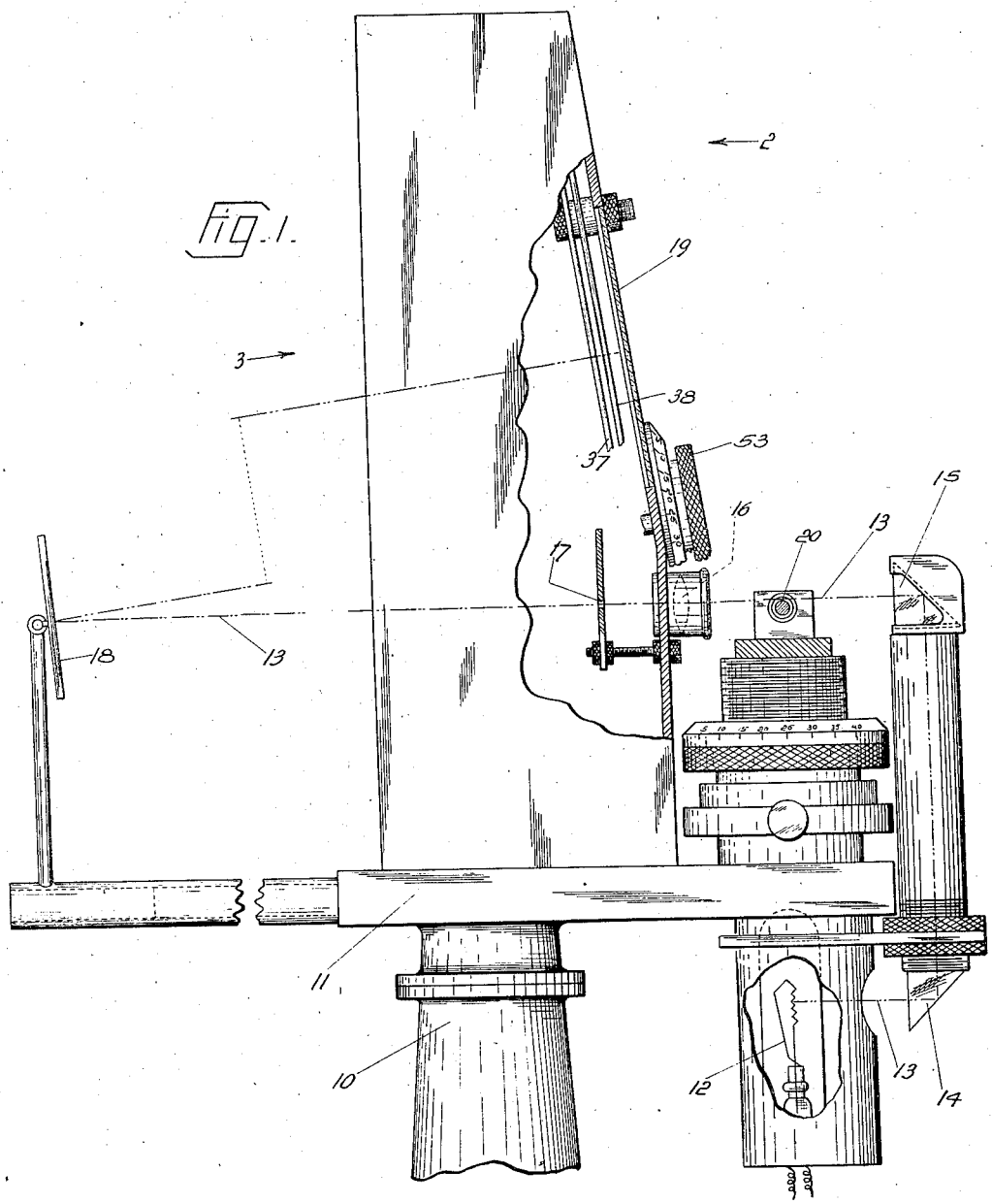
Figure 1 is a longitudinal side view of my new device, partly in section.

As shown in Figure 1, my new testing device is provided with a common support 10 holding a platform 11 upon which all parts of the device are arranged or to which such parts are attached. Thus, as mentioned above, one of the main parts of my device is a projection lamp 12 emitting a light beam 13 which is deflected twice by prisms 14 and 15 and directed through the optical system 16 and slot 17 upon the deflecting mirror 18 which reflects it upon ground glass 19 serving as screen. This way of arranging the light source and directing the light beam emitted by it has not only the advantage of keeping the heat of the projection lamp from the operator of the device, but makes it also possible to arrange the object, e. g. the screw or thread gauge to be tested in a very comfortable position easy to observe and adjust during operation of the device.

The tested object, in the embodiment described herewith, a thread gauge 20, is supported by two centers 21 and 22. Center 21 is slidably journalled in bearing 23 and pressed by means of spring 24 permanently in direction of arrow 25 against the thread gauge 20. Center 22 is also slidably journalled in bearing 24 which is connected with micrometer 25 having a knob 26 by which the bearing 24 can be slid to and fro in direction of arrow 28 on the common supporting plate 27. The distance covered during such movement is indicated with utmost accuracy by micrometer 25. Since bearing 23 is firmly secured to supporting plate 27 and center 21 is permanently pressed in direction of arrow S by spring 24, it is evident that during movement of bearing 24 to and fro in direction of arrow 28, the tested object, i. e. the tested thread gauge 20, will move together with center 21 secured to bearing 24; thus, the micrometer 25 will indicate the distance traveled by the thread gauge during the testing operation which will be described below in detail.

Besides this movement of the tested object, i. e. the thread gauge 20, in horizontal position, it is also possible to move the entire supporting plate 27 up and down in vertical direction indicated by arrow 30 by means of the lifting arrangement 29. Since mechanisms for enabling such movements are well-known in the art, the details of the same will not be described in detail.

Furthermore, it is also possible to turn the entire work piece carrier 31 together with supporting plate 27 and the lifting arrangement 29 about a vertical axis; this turning movement is obtained by means of a turning arrangement 32 of well-known type combined with work piece carrier 31.

It is evident that the above described means are supporting the tested object, e. g. the tested thread gauge 20, movable in three directions, namely to and fro in horizontal direction as indicated by arrow 28, up and down in vertical direction as indicated by arrow 30, and back and forth about its vertical axis as indicated by arrow 33.

The vertical movement of the tested thread gauge 20 serves mainly for adjusting the tested screw threaded portion of the gauge correctly in the path of the light beam between prism 15 and the optical system 16; the turning movement of the tested gauge serves mainly for obtaining a sharp shadow image of the contour of the tested gauge on the screen 19; and finally, the horizontal movement of the tested gauge serves mainly for certain testing purposes which will be described in detail below.

Figure 2:
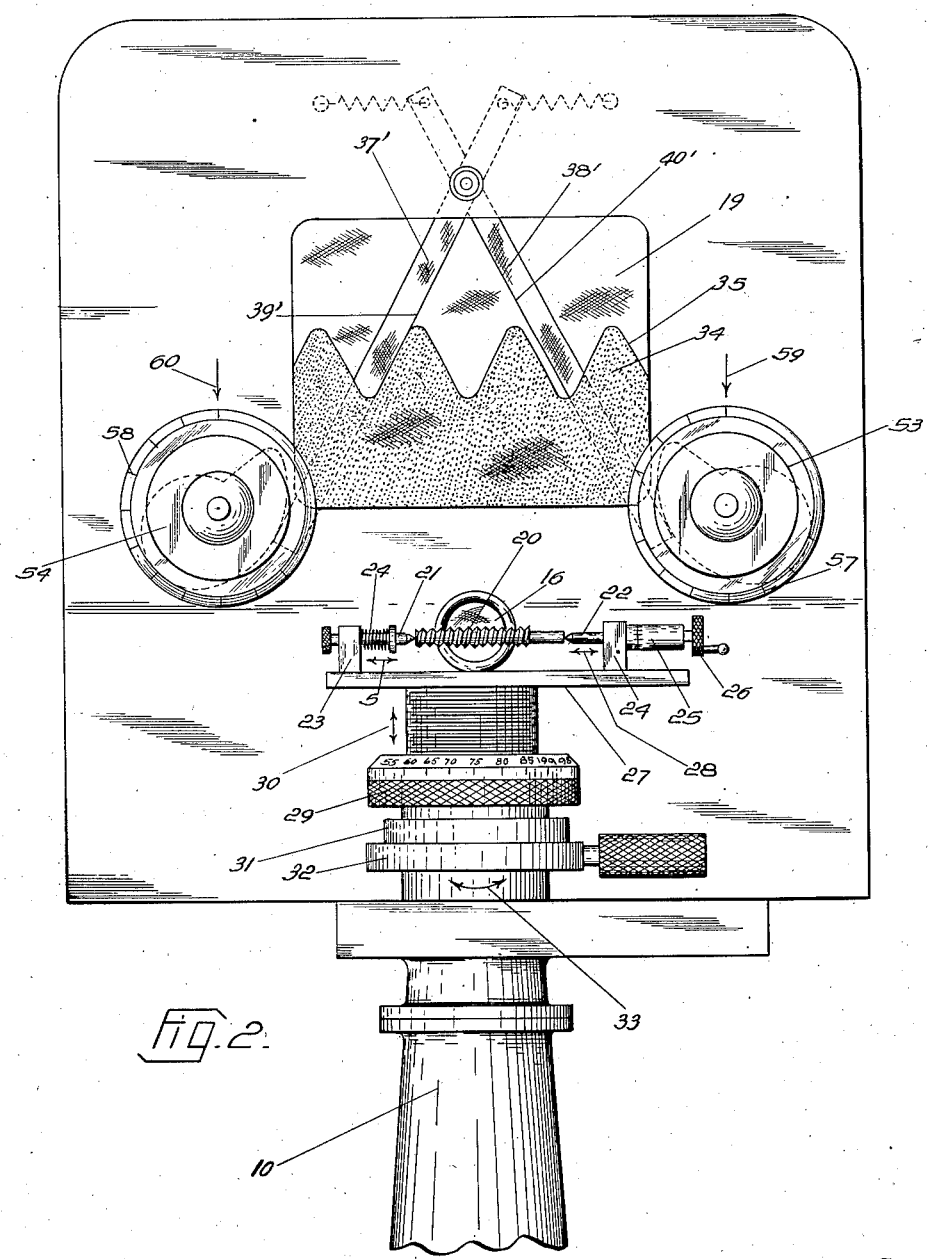
Figure 2 is a front view of the device shown in Figure 1, without the prism system shown in that figure, seen in direction of arrow 2 of Figure 1.

All above described parts of my new device serve only to produce a sharp shadow image of the tested gauge and its contour on screen 19. Since such tested gauges are usually opaque, the shadow image 34 of the gauge will appear dark gray, nearly black, as shown in Figure 2. The outline 35 of this shadow image will show an enlarged view of the screw thread contour and contain straight outline portions 36 corresponding to the flanks of the teeth of the screw thread.

Figure 3:
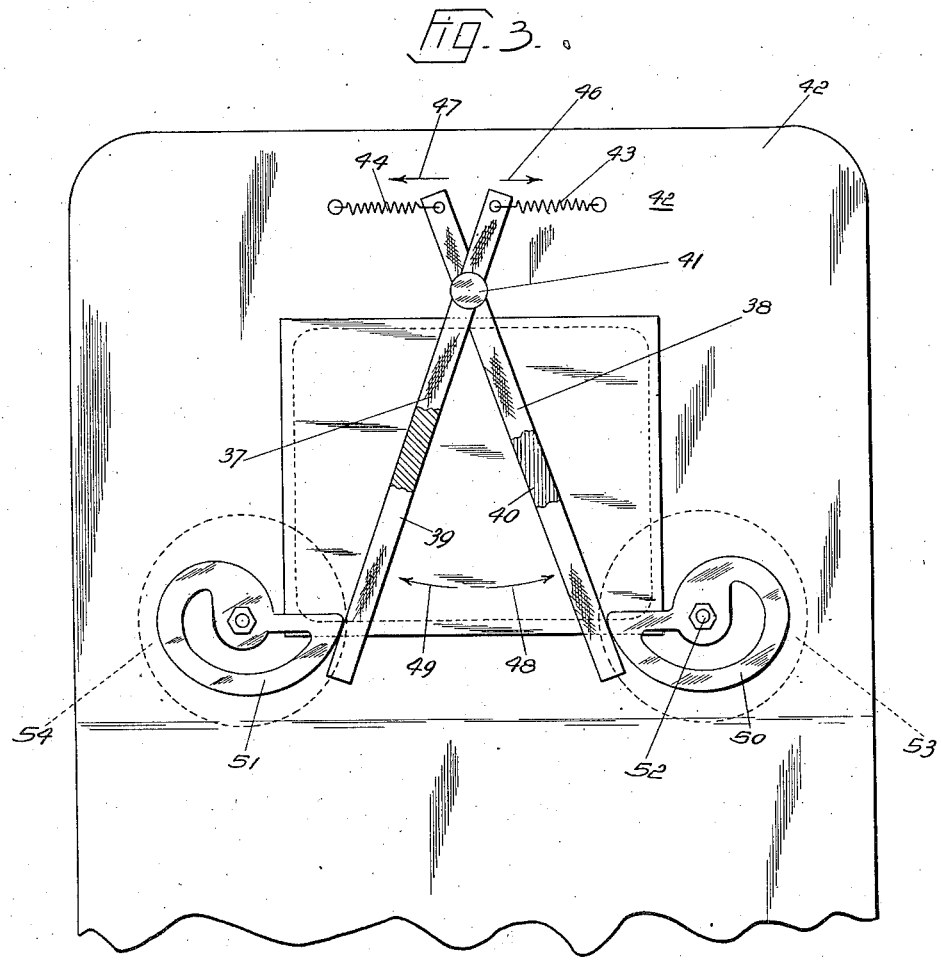
Figure 3 is a rear view of the screen and the frame surrounding it, seen in direction of arrow 3 of Figure 1.
Figure 4:
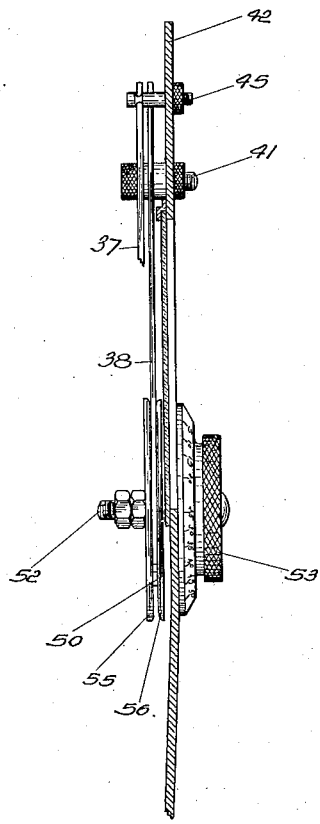
Figure 4 is a cross section through the testing member arrangement, along line 4—4 of Figure 3.

The testing members 37 and 38 provided in accordance with my present invention are clearly shown in Figures 3 and 4. They have a longitudinal shape, are flat and have straight testing edges 39 and 40, respectively. A further important characteristic of these testing members is that they are colored, preferably differently, e. g. the testing member 37 green and the testing member 38 red. Furthermore, as mentioned above, these members are semi-transparent so as to form during projection the images 37' and 38' of the testing members 37 and 38 respectively on screen 19. Of course, these images also have edges 39' and 40' corresponding to the testing edges 39 and 40 respectively of the members 37 and 38. Furthermore, it is evident that these images are also colored, image 37' being green corresponding to the green color of testing member 37 and image 38' being red, corresponding to the red color of testing member 38.

As shown in Figures 3 and 4, the testing members are freely turnably pivoted by means of pivot 41 to frame 42 surrounding and supporting screen 19. At their upper ends, these testing members 37 and 38 are combined with springs 43 and 44 respectively. Each of these springs is secured at one end to the corresponding testing member and at its other end by means of screw 45 to frame 42; thus, these springs 43 and 44 are pulling the upper ends of the testing members in the directions indicated by arrows 46 and 47, thereby urging testing member 38 to turn about pivot 41 in direction of arrow 48 and testing member 37 in direction of arrow 49.

The turning movement of the testing members 37 and 38 in direction of arrows 49 and 48 respectively is limited by the cam-shaped members 50 and 51; these cam-shaped members are turnably journalled to frame 42 by means of pivots 52 and may be turned by knobs 53 and 54. In order to avoid that the testing members 37 and 38 slide off the edges of the cam-shaped members 51 and 50 respectively, these cam-shaped members are provided with guiding plates 55 and 56 holding the testing members in proper contact with the cam-shaped members.

The purpose of these cam-shaped members and the knobs connected with them is to adjust the position of the testing members 37 and 38. The scale indications 57 and 58 provided on knobs 53 and 54 respectively and co-operating with the pointers 59 and 60, respectively, are calibrated in such a manner as to indicate the angle enclosed between the testing edges 40' and 39' of the images 38' and 37' of the testing members 38 and 37 respectively and a perpendicular line through pivot 41. Thus, scale 58 will indicate the angle between the edge 39' and perpendicular line through pivot 41 and scale 57 will indicate the angle between the edge 40' and the same perpendicular line; the indications on both scales 57 and 58 added will indicate the angle enclosed by lines 39' and 40'.

It should be mentioned that the testing members 37 and 38 should be arranged as near as possible to the screen 19 in order to assure clear and sharp images of these members on the screen.

My new testing and comparing device described above operates as follows:

First, the object to be tested, e. g. thread gauge 20, is placed between the centers 21 and 22 and adjusted so as to create on screen 19 a shadow image 34 of the type shown. This adjustment is carried out by lifting, turning and horizontally shifting the tested thread gauge by the means described above.

Then, if it is intended to check and test the thread angle, i. e. the angle enclosed by two flanks 36 of the thread, the following steps have to be taken:

a. One of the testing members, e. g. testing member 37, is turned by knob 54 until its image 37' and particularly the edge 39' of this image appears to be parallel to the nearest flank 36. Then, the screw thread 20 is shifted by knob 26 in horizontal direction, until the image of flank 36 coincides with edge 39'. Of course, it might be necessary to first move the image of flank 36 near this edge 39' and then to adjust again the direction of the testing member 37 by knob 54. This adjustment of testing member 37 and its image 37' by means of knob 54 and adjustment of the tested thread gauge 20 by means of knob 26 is repeated until the edges 39' of the image of the testing member 37 and the flank 36 of the image 34 of the tested thread gauge 20 completely and precisely coincide. The indication on scale 58 will then show the angle between flank 36 of the screw thread and a plane normal to the longitudinal axis of the thread gauge.

b. The next step is to move the testing member 38 and the tested thread gauge 20 in such a manner that edge 40' of image 38' of the testing member 38 coincides with an edge 36 of image 34 of screw thread 20. This procedure is carried out in the same way as explained in the previous paragraph in connection with adjustment of the testing member 37. The indication on scale 57 will then show the angle between flank 36 of one tooth of the screw thread and a plane normal to the longitudinal axis of the threaded gauge.

c. Thereafter, it is only necessary to add the indications on both scales 57 and 58 in order to obtain the actual angle of the tested screw thread.

If it is desired to measure the lead or pitch of a tested screw thread, the tested thread gauge 20 is shifted horizontally until the image of one of its flanks 36 coincides with one of the edges 39' or 40' of the images of the testing members. Then, the indication on micrometer 25 is read and noted. Thereafter, the tested thread gauge 20 is horizontally shifted in direction of arrow 28 by means of knob 26 until the corresponding flank of the next thread of the screw coincides with the edge of the image of the testing member. Then, the micrometer indication is read again; the result obtained by subtraction of the smaller indication from the large will indicate the pitch of the tested screw.

I wish to mention that my new testing device is adapted to measure not only the lead, pitch and angle of the thread but also other thread elements, as for instance the depth of the thread, the helix angle, the minor diameter, symmetry, width of flat on flatcrested threads, width and depth of undercut on undercut threads, radii of crest and root on full form Whitworth and B. A. threads, and concentricity of the thread.

It will be understood that each of the elements described above, or two or more together, may also find a useful application in other types of testing apparatus differing from the types described above.

While I have illustrated and described the invention as embodied in screw thread comparators, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In a screw thread testing device a screen, a support for holding a screw threaded tested object, means for projecting a shadow image of the screw threaded part of said tested object on said screen, means for projecting a shadow image of a testing member on said screen, independent adjustable supporting and mounting means holding said testing member during said projection of its shadow image on said screen, and manually operated for moving said independent adjustable supporting and mounting means holding said testing member during projection of its shadow image on said screen independently from said tested object so as to move said shadow image of said testing member adjacent to said shadow image of said screw threaded part of said tested object so that said shadow images of said testing member and of said screw threaded part of said tested object may be simultaneously observed and compared with each other.

2. In a screw thread testing device a screen, a support for holding a screw threaded tested object, means for projecting a shadow image of the screw threaded part of said tested object on said screen, means for moving said support so as to move said projected shadow image of said screw threaded part of said tested object on said screen, a testing member, means for projecting a shadow image of said testing member on said screen, independent adjustable supporting and mounting means holding said testing member during said projection of its shadow image on said screen, and manually operated means for moving said independent adjustable supporting and mounting means holding its shadow image during projection of said testing member on said screen independently from said tested object and its shadow image so as to move the shadow images of said testing member and said screw threaded part of said tested object adjacent to each other on said screen.

3. In an optical testing comparator a screen, an adjustable support for holding a testing member having a prescribed outline, means for projecting a shadow image of said testing member upon said screen while held by said adjustable support so that a shadow image of said prescribed outline appears on said screen, means for moving said support so as to move said shadow image of said testing member on said screen, independent means for supporting a tested object having an outline to be tested and compared with said prescribed outline of said testing member, means for projecting a shadow image of said tested object on said screen so that a shadow image of said oultine to be tested appears on said screen, and means for moving said supporting means while the same are holding said object to be tested independently from said testing member and its shadow image, said means for moving said holding means and said means for moving said supporting means thus enabling moving of said shadow images of said testing member and said tested object on said screen independently from each other so that said shadow images of said prescribed outline of said testing member and of said tested outline of said tested object are lying adjacent to each other.

4. In a screw thread testing device, a screen, a projecting light source emitting a light beam directed on said screen, means supporting at least the screw threaded part of a tested opaque object in the path of said light beam, so that a shadow image of said object showing said screw threaded outline appears on said screen, independent adjustable supporting and mounting means for supporting a semi-transparent colored testing member in the path of said light beam so that a colored image of said testing member appears on said screen, manually operated means for moving said independent adjustable supporting and mounting support for said semi-transparent colored testing member independenly from said tested object and its shadow image so as to move its colored image on said screen adjacent to said shadow image of the tested outline of said tested object, enabling thereby comparison of said shadow image of said outline of said tested object with said colored image of said testing member.

5. In an optical testing comparator a projection screen, a projecting light source emitting a light beam directed on said projection screen, a semi-transparent colored testing member having a testing outline, an adjustable support for holding said testing member in the path of said light beam so as to create a colored image of said testing member on said projection screen, manually operated means for moving said adjustable support so as to move said testing member and its colored image on said screen, means for supporting an opaque tested object having an outline to be tested and to be compared with said testing outline of said testing member in the path of said light beam so as to create a shadow image of said tested object on said projection screen, means for moving said support of said opaque tested object independently from said testing member and its colored image so as to move said object and its shadow image on said projection screen, both said moving means enabling moving said colored image of said testing member and said shadow image of said tested member relative to each other on said projection screen, so that the colored image of said testing outline of said testing member is lying on said projection screen adjacent to the shadow image of said outline to be tested of said tested object and can be easily compared with it.

6. In an optical testing comparator for testing a screw thread, a screen, a projecting light source emitting a light beam directed on said screen, a semi-transparent colored testing member having an outline at least a portion of which corresponds to the testing outline of the screw thread to be tested, an adjustable support for holding said testing member in the path of said light beam so as to create a colored image of said testing member on said screen, said colored image having an outline at least a portion of which corresponds to the image of said testing outline of said screw thread to be tested, manually operated means for moving said adjustable support so as to move said image of said testing member on said screen, means holding an opaque tested object having a screw thread to be tested in the path of said light beam so as to create on said screen a shadow image of said screw thread, and means moving said holding means independently from said testing member and its colored image so as to move said shadow image of said screw threaded portion of said tested object on said screen, both said moving means enabling moving of said colored image of said testing member with its testing outline adjacent to the outline to be tested of said shadow image of said screw threaded tested object, thus enabling easy visual observation and comparison of said images with each other.

7. In an optical testing comparator for testing screw threads having at least partly straight flanks determining the angle of said screw thread, a screen, a projecting light source emitting a light beam directed on said screen, a semi-transparent colored testing member having a straight testing edge, a support for holding said testing member in the path of said light beam so as to create on said screen a colored image of said testing member, means for moving said support so as to move said colored image of said testing member on said screen, means for holding an opaque object having a screw threaded portion having an outline consisting at least partly of straight lines in the path of said light beam so as to create on said screen a shadow image of said screw threaded portion of said tested object having an outline consisting at least partly of straight edge portions, and means for moving said holding means independently from said testing member and its colored image so as to move said shadow image of said screw threaded portion of said tested object on said screen, both said moving means enabling moving of the straight edge portion of said colored image of said testing member adjacent to one of the straight edge portions of said shadow image of said screw threaded portion of said tested object, thereby enabling easy comparison of said straight edge portions of said images of said testing member and said screw threaded portion of said tested object.

8. In an optical testing comparator for testing screw threads having at least partly straight flanks determining the angle of said screw thread, a screen, a projecting light source emitting a light beam directed on said screen, a semi-transparent colored testing member having a straight testing edge, a support for holding said testing member in the path of said light beam so as to create on said screen a colored image of said testing member, means for moving said support so as to move said colored image of said testing member on said screen, means for indicating the movement of said support, means holding an opaque tested object having a screw threaded portion having an outline consisting at least partly of straight lines in the path of said light beam so as to create on said screen a shadow image of said screw threaded portion of said tested object having an outline consisting at least partly of straight edge portions, and means for moving said holding means independently from said testing member and its colored image so as to move said shadow image of said screw threaded portion of said tested object on said screen, both said moving means enabling moving of the straight edge portion of said colored image of said testing member adjacent to one of the straight edge portions of said shadow image of said screw threaded portion of said tested object, thereby enabling easy comparison of said straight edge portions of said images of said testing member and said screw threaded portion of said tested object, and determination of the angle of said straight edge portions of said screw threaded portion of said tested object by observation of said means indicating the movement of the support of said testing member.

9. In an optical testing comparator for testing and comparing screw threads having at least partly straight flanks determining the angle of said screw thread, a projection screen upon which a shadow image of said screw thread is projected, a testing member having at least one straight testing edge and being adapted to be projected on said screen, means turnably pivoting said testing member to a stationary support, and means measuring the angular movement and position of said testing member, said measuring means enabling determination of the angular position of said straight flanks of said projected screw thread by moving said testing member so that the straight outline portion of its shadow image on said screen corresponding to its straight testing edge of said testing member coincides with one of the straight outline portions of said shadow image of said tested screw thread corresponding to one of its flanks and reading thereafter the angular position indicated on said measuring means.

10. In an optical screw thread testing device, a projection screen upon which a shadow image of the tested screw thread is projected, a colored semi-transparent testing member having a straight testing edge adapted to be projected on said screen and to create on the same a colored image of said testing member, said colored image of said testing member having a straight outline portion corresponding to its straight testing edge, means turnably supporting said testing member, and means for measuring the angular movement and position of said testing member, said measuring means enabling determination of the angular position of a straight edge portion of said projected screw thread by turning said testing member so that said straight outline portion of its colored image on said screen coincides with a straight outline portion of said shadow image of the screw thread to be tested, and reading thereafter the angular position indicated by said measuring means.

11. In an optical testing comparator for testing the angle of a tooth of a screw thread having straight flanks determining the angle of said screw thread, a projection screen upon which an image of said screw thread is projected, said projected image of said screw thread having straight outline portions corresponding to said straight flanks, two testing members turnably pivoted to the same point of a stationary support and arranged so as to be adapted to be projected on said screen, each of said testing members having a straight testing edge appearing on said screen as a straight outline portion when the images of said testing members are projected on said screen, means moving each of said testing members separately about said pivoting point, thereby varying the angle enclosed by said straight testing edges and by said straight outline portions of said images of said testing members on said screen, and means indicating the angular movement and position of each of said testing members.

12. In a screw thread testing device a screen, a support for holding a tested screw having straight flanks, means for projecting a shadow image of a screw threaded part of said screw on said screen, said shadow image of said screw threaded part of said screw having an outline comprising straight outline portions corresponding to said straight flanks of said tested screw, means for moving said support so as to move said projected shadow image of said screw threaded part of said screw on said screen, two testing members turnably pivoted to the same point of a stationary support, each of said testing members having a straight testing edge, means for projecting a shadow image of said testing members on said screen adjacent to said shadow image of said screw threaded part of said screw on said screw, means for turning said testing members about their common pivoting point, and means for indicating the angular movement and position of said testing members.

13. In an optical testing comparator a screen, a projecting light source emitting a light beam directed on said screen, a testing member having a testing edge portion, a support for holding said testing member in the path of said light beam so as to create on said screen a shadow image of the testing member having a straight outline portion, means for moving said support so as to move said shadow image of said testing member on said screen, means for holding an opaque tested object having a screw threaded portion having straight flanks in the path of said light beam so as to create on said screen a shadow image of said screw threaded portion having straight outline portions corresponding to said flanks of said screw threaded portion of said tested object, said holding means holding said object in such a position that said screw threaded portion is arranged with its axis in horizontal direction, means for moving said holding means independently from said testing member and its shadow image horizontally in axial direction of said screw threaded portion of said tested object, and means for moving said holding means vertically normal to the axis of said screw threaded portion of said tested object also independently from said testing member and its shadow image, said moving means enabling moving of the image of said screw threaded portion of said tested object on said screen in horizontal and vertical directions independently from said shadow image of said testing member.

14. In an optical testing device for testing the lead and angle of screw threaded objects a screen, a projecting light source emitting a light beam directed on said screen, two semi-transparent colored testing members having each a straight testing edge, said testing members being turnably pivoted to the same point of a stationary support in the path of said light beam so that colored images of said testing members are projected on said screen, a support adapted to support the screw threaded object to be tested in the path of said light beam so that a shadow image of said object is projected on said screen, means for moving said support independently from said testing members and their colored images in direction of the axis of said screw threaded object, means for indicating the length of movement of said support in said axial direction, and means for moving said support normal to said axial direction also independently from said testing members and their colored images.

15. In combination, a semi-transparent screen, means for directing a light beam on said semi-transparent screen, a flat support surrounding said screen and holding the same, two semi-transparent colored testing members having each a straight testing edge, pivoting means turnably securing said testing members to said support in the path of said light so that colored images of said testing members are projected on said screen, means for turning said testing members about said pivoting means, and means for indicating the angular movement and position of said testing members.

16. In combination, a ground glass screen, a frame surrounding and supporting said screen, means for directing a light beam on said semi-transparent screen, two straight-edged longitudinal rigid semi-transparent testing members arranged parallel to said screen at a slight distance behind the same, pivoting means turnably securing said testing members to a common pivoting point of said frame in the path of said light beam so as to enable projection of colored images of said testing members on said screen, turnable cam-like members adapted to turn each of said testing members about their common pivoting point, and indicating means indicating the angular movement of said turnable cam-like members and of said testing members turned by the same.

17. A comparator for testing the outline of a test object comprising a screen, a projecting light source emitting a light beam directed on said screen, means supporting at least a part of said test object in the path of said light beam so that a shadow image of said test object showing an outline of the same appears on said screen, a testing member, means supporting said testing member in the path of said light beam independently from said support for said test object and said object itself so that a shadow image of the same appears on said screen, means for moving said support for said testing member independently from said support for said test object and said object itself so as to move its shadow image on said screen adjacent to said shadow image of said test object, enabling thereby comparison of said shadow image of said test object with said shadow image of said testing member.

18. A comparator for testing the outline of an opaque test object comprising a screen, means directing a light beam on said screen, means supporting at least a part of said test object in the path of said light beam so that a shadow image of said test object showing at least part of the outline of the same appears on said screen, a semi-transparent testing member, means supporting said semi-transparent testing member in the path of said light beam independently from said support for said test object and said object itself so that a semi-opaque shadow image of the same appears on said screen, means for moving said supporting means for said semi-transparent testing member independently from said support for said test object and said test object itself so as to move its semi-opaque shadow image on said screen adjacent to said shadow image of said test object, enabling thereby comparison of said shadow image of said test object with said semi-opaque shadow image of said testing member.

FRANZ G. BACK.